US009713207B2

(12) United States Patent
Jermyn

(10) Patent No.: US 9,713,207 B2
(45) Date of Patent: Jul. 18, 2017

(54) DRIVER MODULE FOR DRIVING LEDS

(71) Applicant: Tridonic GmbH & Co KG, Dornbirn (AT)

(72) Inventor: Philip Jermyn, Durham (GB)

(73) Assignee: Tridonic GmbH & Co. KG, Dornbirn (AT)

( * ) Notice: Subject to any disclaimer, the term of this patent is extended or adjusted under 35 U.S.C. 154(b) by 0 days.

(21) Appl. No.: 15/036,880

(22) PCT Filed: Nov. 18, 2014

(86) PCT No.: PCT/EP2014/003077
§ 371 (c)(1),
(2) Date: May 16, 2016

(87) PCT Pub. No.: WO2015/070990
PCT Pub. Date: May 21, 2015

(65) Prior Publication Data
US 2016/0278171 A1  Sep. 22, 2016

(30) Foreign Application Priority Data

Nov. 18, 2013 (EP) .................................... 13193318
Nov. 18, 2013 (GB) .................................... 1320384.9

(51) Int. Cl.
*H05B 33/08* (2006.01)
(52) U.S. Cl.
CPC ....... *H05B 33/0815* (2013.01); *H05B 33/083* (2013.01); *H05B 33/0845* (2013.01)
(58) Field of Classification Search
CPC .............. H05B 33/0815; H05B 33/083; H05B 33/0845; H05B 33/0821; H05B 33/0824; H02M 3/07; H02M 3/156; H02M 1/08
(Continued)

(56) References Cited

U.S. PATENT DOCUMENTS 8,159,091 B2 * 4/2012 Yeates .................... H02M 3/07
307/110
8,698,406 B2  4/2014 Radermacher
(Continued)

FOREIGN PATENT DOCUMENTS

WO  2011108876 A2  9/2011
WO  2011141856 A1  11/2011

OTHER PUBLICATIONS

International Search Report and Written Opinion issued in connection with the corresponding International Application No. PCT/EP2014/003077on Jun. 11, 2015.
(Continued)

*Primary Examiner* — Haissa Philogene
(74) *Attorney, Agent, or Firm* — The H.T. Than Law Group

(57) ABSTRACT

The invention proposes a driver module for driving LEDs, wherein the driver module comprises: —a rectifier (D1) for generating a supply voltage by rectifying an input AC voltage (Vin), —a load path with nodes (B, C) for connecting an LED string (10) comprising one or a plurality of LEDs (D), —a current source (IS1) coupled with the load path for generating a preferably constant current for the load path, and—a capacitive unit comprising at least two capacitors (C1, C2) for storing electrical energy from the rectifier (D1) during a charging phase and for providing electrical energy to the load path during a discharging phase, wherein the capacitive arrangement (11, 11', 11") is configured such that the two capacitors (C1, C2) are in a parallel arrangement (11) in the charging phase and in a serial arrangement (11") in the discharging phase.

20 Claims, 7 Drawing Sheets

(58) Field of Classification Search
USPC ... 315/185 R, 187, 188, 193, 291, 312, 362; 307/109, 110
See application file for complete search history.

(56) References Cited

U.S. PATENT DOCUMENTS

| | | |
|---|---|---|
| 9,380,669 B2 * | 6/2016 | Chu .................. H05B 33/083 |
| 2013/0128641 A1 | 5/2013 | Higashihama et al. |
| 2014/0062323 A1 | 3/2014 | Pan |
| 2014/0145683 A1 | 5/2014 | Mancic et al. |

OTHER PUBLICATIONS

Search Report issued in connection with the corresponding Great Britain application No. GB 1320384.9 on Jun. 19, 2014.

* cited by examiner

DRIVER MODULE FOR DRIVING LEDS

FIELD OF THE INVENTION

The invention is directed on a driver module for driving LEDs directly from an AC supply. 'Directly' has to be understood that there is no switch mode circuitry in this driver, wherein such a switch mode circuitry can e.g. comprise an AC-DC converter switched at a high frequency to generate a DC supply for the LEDs.

BACKGROUND OF THE INVENTION

The possibility of driving LEDs directly from an AC mains voltage is known from the prior art. However, known driver modules are disadvantageous because of a flickering effect occurring when an LED string is operated. For an LED string to emit light and for a current to flow through the LED string, it is indeed necessary that the voltage across the LEDs is high enough. The voltage should be higher than the forward voltage of the LED string. Since the supply is achieved by an alternating voltage, the forward voltage necessary for emitting light is not reached during the whole period of the mains supply. This is perceived as a flickering effect.

Document WO 2011/141856 A1 provides a driver module for driving LEDs from a rectified mains voltage. The driver module comprises a current source, first and second capacitors and two diodes. In a first phase the current source is deactivated, the capacitors charge from the rising input voltage, and the LEDs are fed only by the second capacitor. In a second phase, the capacitors are charged such as no current is drawn from the mains, and the LEDs are still fed by the second capacitor. In a third phase when the input voltage drops further, both capacitors discharge and the LEDs are supplied mainly by the first capacitor.

SUMMARY OF THE INVENTION

The invention thereby proposes an enhanced driver module for driving LEDs and particularly for driving LEDs directly from an AC supply. The invention is particularly directed in avoiding the flickering which typically occurs when an LED-load is driven directly from the mains.

The invention proposes to use at least two capacitors which in different time segments of the sine-wave of the AC mains voltage are effectively differently connected to the LED string and the mains source.

The invention also proposes to drive LEDs in e.g. three different phases. An LED string is thereby driven directly from an AC mains voltage by a constant current source. In one phase the mains voltage can drive the LED and charge the capacitors. In a second phase the capacitors do not have any functionality in the circuitry and the AC mains voltage can directly drive the LED string. In a third stage the capacitors can discharge (in a series arrangement) such that e.g. the combined AC voltage and the discharging voltage of the capacitors can drive the LED string with a constant current.

According to a first aspect of the invention, a driver module for driving LEDs is proposed. The driver module comprises a rectifier for generating a supply voltage by rectifying an input AC voltage. The driver module comprises a load path with nodes for connecting an LED string comprising one or a plurality of LEDs. The driver module comprises a current source coupled with the load path for generating a preferably constant current for the load path. The driver module comprises a capacitive unit comprising at least two capacitors for storing electrical energy from the rectifier during a charging phase and for providing electrical energy to the load path during a discharging phase. The capacitive arrangement is configured such that the two capacitors are in a parallel arrangement in the charging phase and in a serial arrangement in the discharging phase.

According to a further aspect of the invention, a method for driving LEDs is proposed. The method comprises generating a supply voltage by rectifying an input AC voltage. The method comprises generating a preferably constant current for a load path with nodes for connecting an LED string comprising one or a plurality of LEDs. A capacitive unit comprising at least two capacitors stores electrical energy from the supply voltage during a charging phase and provides electrical energy to the load path during a discharging phase. The capacitive arrangement is configured such that the two capacitors are in a parallel arrangement in the charging phase and in a serial arrangement in the discharging phase.

Advantageously, the discharging phase ends and the charging phase begins when the supply voltage reaches or exceeds the forward voltage of the LED string.

Advantageously, the capacitive arrangement is configured to be bypassed in a direct drive phase, in which the load path is driven by the supply voltage.

This means that the load path is driven directly by the supply voltage. The load path is thereby driven only by the supply voltage since the capacitive arrangement is bypassed and does not provide electrical energy to the load path in this direct drive phase.

Advantageously, the charging phase ends and the direct drive phase starts when the supply voltage reaches or falls below a value being the addition of the forward voltage of the LED string and the voltage across the capacitors.

Advantageously, the direct drive phase ends and the discharging phase starts when the supply voltage reaches or falls below the forward voltage of the LED string.

Advantageously, the driver module comprises voltage sensors for automatically detecting the condition for ending a phase and beginning a new phase.

This means that the voltage sensors are used for automatically detecting when the supply voltage reaches or exceeds/falls below the given value.

Advantageously, the driver module comprises a switching module coupled between the two capacitors in such a way that the parallel arrangement is active if the switching module is switched off, and the serial arrangement is active if the switching module is switched on.

This switching module switches on and off automatically if the condition for the parallel arrangement or for the serial arrangement is fulfilled.

Advantageously, the driver module comprises a switching module coupled to the capacitive unit so as to bypass, in the direct drive phase, the capacitors if the switching module is switched on.

This means that the capacitors are not bypassed if the switching module is switched off. This switching module also switches on and off automatically if the condition for bypassing the capacitors is fulfilled.

Advantageously, the load path comprises further nodes for connecting a second LED string in series with the LED string, and a bypass module is provided so as to automatically bypass the further nodes if the supply voltage is not sufficient to drive the second LED string.

Advantageously, the LED string and the second LED string respectively consist in LEDs connected in series, and the number of LEDs of the second LED string is lower than the number of LEDs of the LED string, preferably lower than half the number of LEDs of the LED string.

Advantageously, the driver module comprises a module for switching off the supply voltage during the discharging phase, and preferably from the beginning of the discharging phase until the supply voltage reaches the value zero, such that only the capacitive unit provides electrical energy to the load path.

A transistor of the driver module, in particular an output transistor, can be replaced by a number of parallel transistors. The number of parallel transistors in their conductive state may conduct the same current as the replaced transistor. They preferably perform the same switching action as the replaced transistor. The number of parallel transistors can be distributed across a LED module and/or a PCB.

The driver module can comprise a voltage limiter, the voltage limiter preferably comprising a Darlington transistor and/or being connected in series with a voltage supply source.

The first LED string and/or the second LED string may comprise at least two LED string segments, which can be selectively activated/deactivated by segment switches, preferably according to a binary switching pattern.

Advantageously, the load path, the current source and the capacitive unit are connected in series.

According to a further aspect of the invention, an LED-module is proposed, comprising such a driver unit and an LED string connected in the nodes.

According to a further aspect of the invention, an LED-module is proposed, comprising such a driver unit, an LED string connected in the nodes, and a second LED string connected in the further nodes.

Further features, advantages and objects of the present invention will become evident from the following detailed description of preferred embodiments of the invention, when taken in conjunction with the figure of the enclosed drawing.

DETAILED DESCRIPTION OF THE PREFERRED EMBODIMENTS

Figure 1:
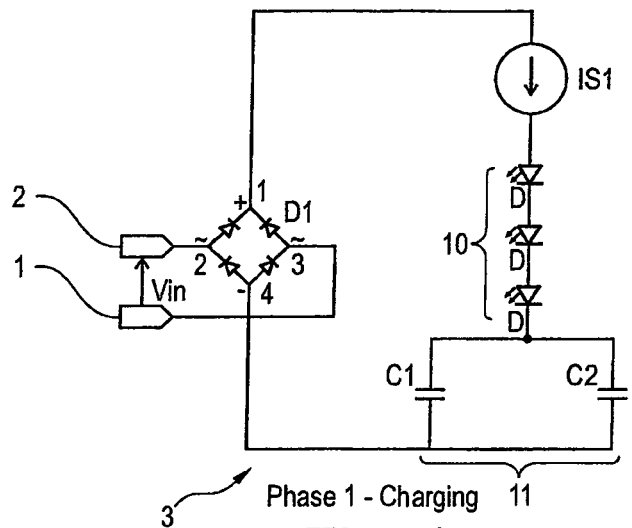
FIGS. 1 to 3 show schematically the structure of a circuit according to the present invention.
Figure 2:
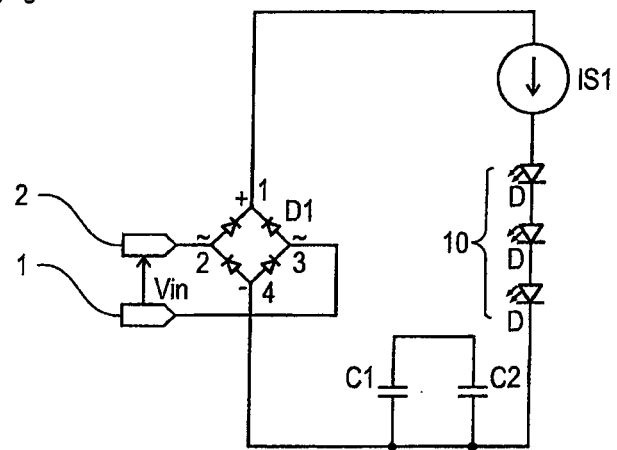
Figure 3:
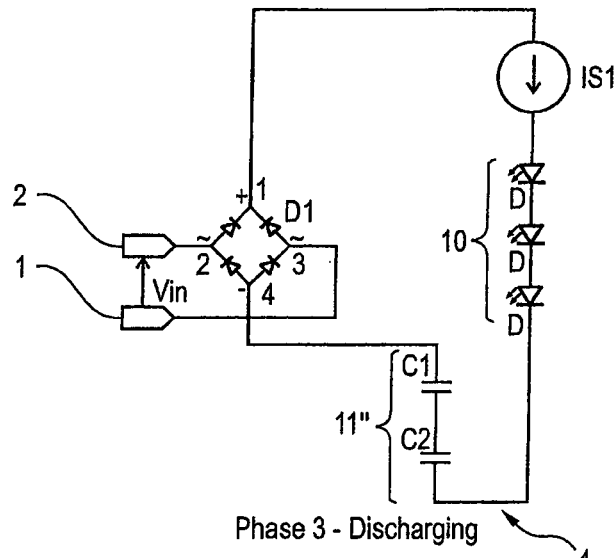

FIGS. 1 to 3 show schematically the structure of a circuit according to the present invention. Said figures in fact show the structure of a driver module in different phases of the supply voltage.

A driver module for driving LEDs according to the present invention is particularly adapted to be supplied with an input voltage Vin in the form of an alternating voltage such as a mains voltage. Said input voltage Vin can for example be a 50 Hz and 230V supply with a peak value of about 325V. The input voltage Vin can present alternative amplitude and frequency values.

As shown in FIGS. 1-3, the input voltage Vin is applied between a first input terminal 1 acting as a reference terminal or neutral and a second input terminal 2. The input voltage Vin is applied to a rectifier for converting the alternating voltage (AC) to a rectified voltage (DC) comprising only positive half-waves. According to a preferred embodiment of the invention, the driver module comprises a bridge rectifier D1 consisting in four diodes in bridge configuration. The output of the bridge rectifier D1 between a positive terminal + and a negative terminal − corresponds to a full-wave rectified voltage.

FIG. 1 shows the structure of the driver module 3 in a first phase of the sine-wave of the AC mains voltage. This first phase corresponds to a particular time segment within a period of the input voltage Vin. This first phase can be referred to as a charging phase.

The driver module 3 comprises a current source IS1 providing a current of for example 100 mA. A LED set or LED string 10 is connected in series with the current source IS1. The LED string comprises at least one LED, preferably a plurality of LEDs connected in series and/or in parallel. A series and parallel arrangement of LEDs can for example correspond to a parallel connection of several series arrangements of LEDs. In the particular embodiment of FIG. 1, the three LEDs D schematically represent a plurality of LEDs coupled in series. For example, 44 LEDs can be coupled in series.

During this first phase of the input voltage, the driver module 3 presents a configuration in which two capacitors C1, C2 are connected in parallel. This parallel arrangement 11 of both capacitors C1, C2 is connected in series with the current source IS1 and the LED string 10. The current source IS1, the LED string and the parallel arrangement 11 of said capacitors C1, C2 are thereby supplied with the rectified input voltage.

Figure 4:
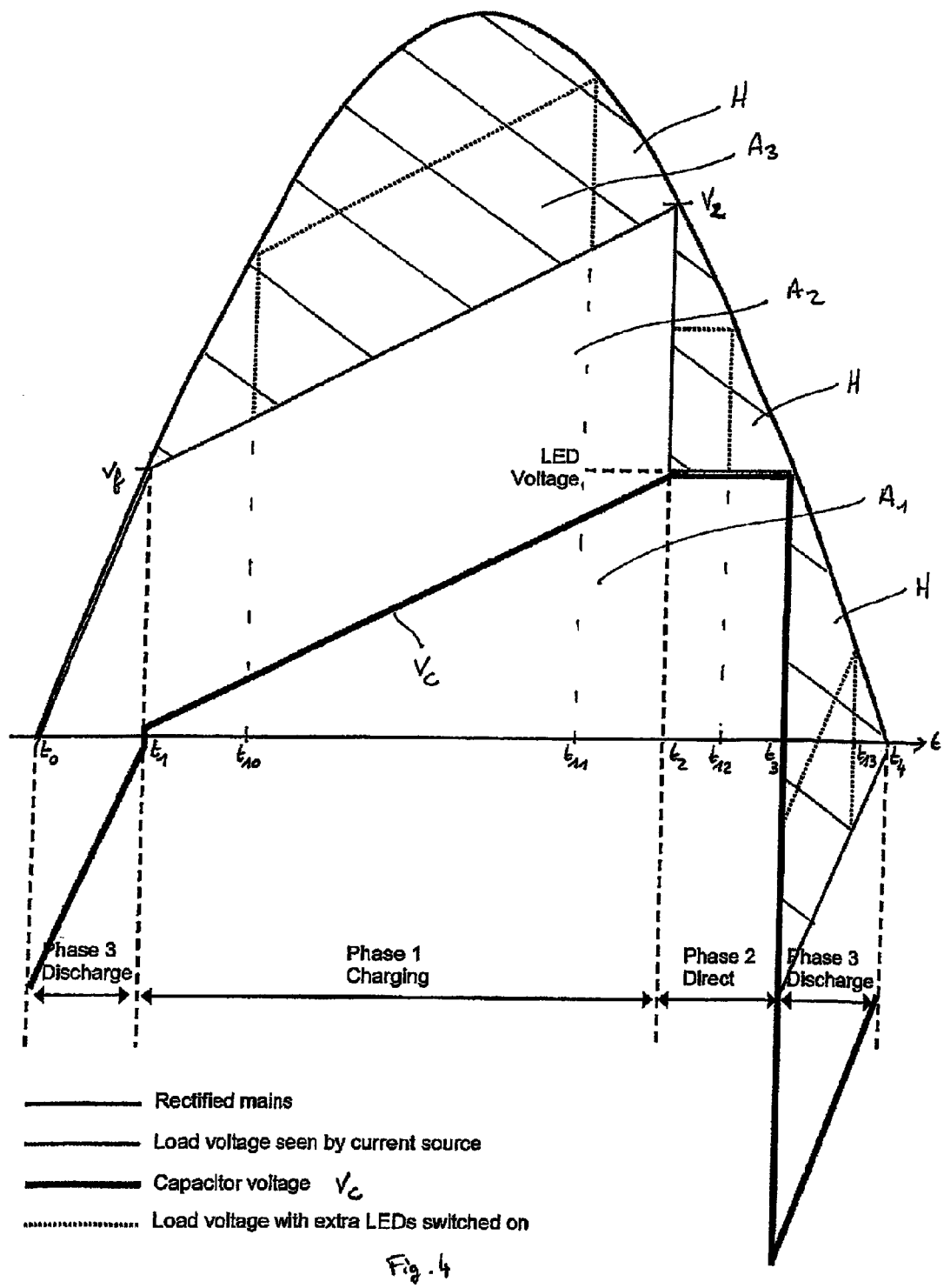
FIG. 4 shows electrical parameters according to the present invention.

FIG. 4 thereby shows different electrical parameters of the driver module 3 during this first charging phase. FIG. 4 shows the evolution of parameters of the LED driver module during a positive half-wave of the input voltage Vin, i.e. during a half-wave of the rectified input voltage.

While the rectified voltage presents the value 0V at the time point t=t0, the first charging phase begins at the time point t=t1 where the increasing rectified voltage reaches or exceeds the value Vf corresponding to the forward voltage of the LED string 10. Indeed, the LEDs D require a minimum forward voltage to turn on, so that similarly also a minimum voltage is required for the LED string 10 to turn on. The forward voltage Vf for the LED string of the particular embodiment of FIGS. 1-3 corresponds to the addition of the individual forward voltage of each LED D of said LED string. The forward voltage Vf of the LED string can e.g. be 120V or 60V. In any case the value Vf is lower than the peak value of the rectified voltage and preferably lower than half of this peak value.

The first charging phase therefore begins at t=t1 when the mains voltage starts exceeding the LED string forward voltage Vf. After the time point t1, the rectified voltage continues to increase above said forward voltage Vf. The voltage VLED across the LED string thereby remains constant or nearly constant.

The voltage across the capacitors, i.e. in phase 1 across the parallel arrangement of capacitors C1, C2, is referred to as Vc. In this first charging phase the current will flow through the constant current source IS1 and through the LED string 10 and will thereby continuously charge the parallel arrangement of the two capacitors C1, C2. Accordingly, it is shown in FIG. 4 that the capacitor voltage Vc increases.

This first charging phase continues until the rectified mains voltage reaches or falls below a value corresponding to the load voltage seen by the current source IS1, i.e. corresponding to the addition of the LED string voltage—the forward voltage Vf—and the capacitor voltage VC. As can be taken from FIG. 4, this value, referred to as V2, is reached at t=t2. In other words, this first charging phase continues until, after having reached its peak, the mains voltage has fallen to a value which represents said addition of the LED string voltage and the voltage of the charged capacitors.

FIG. 2 represents the preferable structure of the LED driver module 4 during the following second phase of the mains voltage, wherein said second phase corresponds to a direct drive phase of the LEDs D. Electrical parameters of the driver module 4 in the second phase are shown in FIG. 4 between the time points t2 and t3.

As shown in FIG. 2, the driver module 4 in the second phase differs from the driver module 3 in the first phase in that the capacitors C1, C2 are arranged in a different way. The remaining structure of the driver module remains the same.

In the capacitor arrangement 11' of the driver module 4 in the second phase, the capacitors C1 and C2 are bypassed. The rectified mains voltage is then applied to the current source IS1 and to the LED string 10. The capacitors C1, C2 are connected in series, whereby due to the bypass the voltage across both capacitors C1, C2 is zero. In the capacitor arrangement 11', the capacitors are inactive within the driver module 4 in that they neither charge, nor discharge.

During the second direct drive phase between t2 and t3, the rectified AC mains voltage continues to drop between time points t2 and t3, as shown in FIG. 4. The fact that the capacitors are inoperative is shown in that the capacitor voltage VC remains constant during the period t2-t3, and in that the load voltage corresponds to the forward voltage Vf. The mains voltage correspondingly drives the LEDs D with constant current until the mains voltage has dropped to a value equal to the LED string voltage Vf at the time point t=t3.

In a following third phase, the driver module presents the structure shown in FIG. 3. In this phase, also called discharging phase, the driver module 5 differs from the driver module 4 in the second phase in that the bypass of the capacitors C1, C2 is removed. The serial arrangement of both capacitors C1, C2 is connected in series with the LED string 10. The rectified input voltage is thereby applied to the current source IS1, the LED string 10 and the capacitor arrangement 11" consisting in the two serial connected capacitors C1, C2.

This third discharging phase is represented in FIG. 4 starting from the time point t3. The third phase starts when the rectified AC mains voltage drops below the LED string voltage Vf. The circuitry implementation is made such that the two capacitors are effectively connected in series relative to each other and relative to the LED string 10. Thus, in this third phase, the LED string 10 is driven with constant current by the charging voltage of the series connection of the two capacitors C1, C2. This third phase will continue until the mains voltage has dropped and reached the zero crossing at the time point t4.

This time point t4 of the end of a half-wave of the rectified voltage preferably corresponds to the beginning of the next half-wave at t=t0. At this point the capacitors C1, C2 will continue the discharge operation until reaching the moment t1 when the rectified mains voltage again exceeds the string voltage Vf in the next half-wave of rectified input voltage. During the whole third phase, which corresponds to the duration t3-t4 of decreasing rectified mains and the duration t0-t1 of increasing rectified mains, the capacitors C1, C2 drive the LED string with a constant current. This third discharging phase continues until the rectified input voltage again reaches or exceeds the string voltage VF at t=t1. After the rectified input voltage has reached again the LED string voltage, i.e. the forward voltage Vf, the first phase begins again and the drive module of the invention again operates in the configuration shown in FIG. 1.

Figure 5:
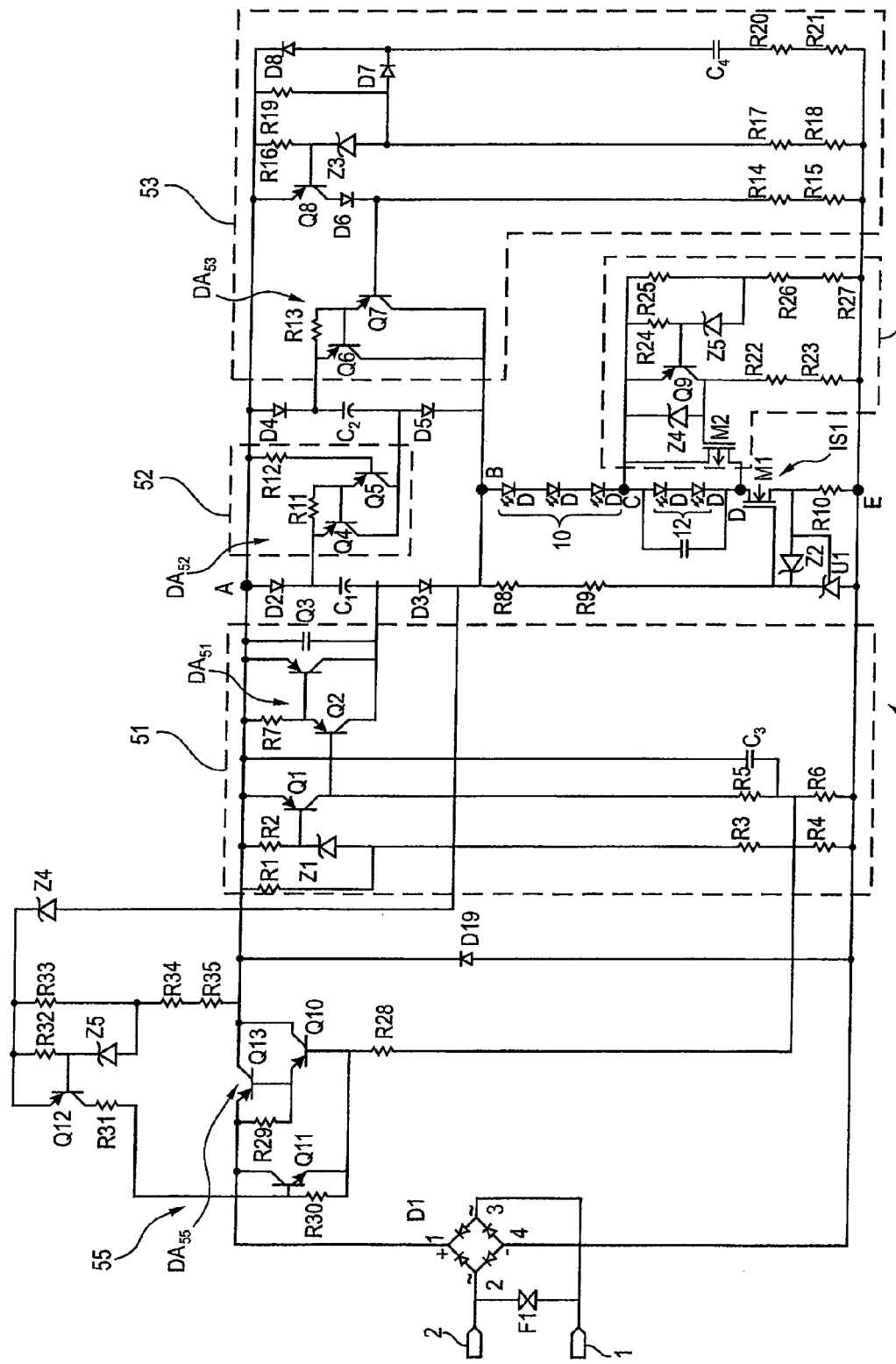
FIG. 5 shows an embodiment of a driver module according to the present invention.

FIG. 5 shows a specific circuitry implementation according to an embodiment of the present invention. This circuit is adapted for achieving the above explained functionality and for providing during different phases of the rectified mains voltage the different structures of the driver module shown in FIGS. 1-3.

The driver module 50 shown in FIG. 5 comprises the input voltage Vin applied between the first input terminal 1 and the second input terminal 2 and rectified by the rectifier D1 as shown in FIGS. 1, 2, 3. In addition thereto, the particular embodiment of the driver module 50 comprises a diode F1 provided between the first and second input terminal 1, 2 upstream of the rectifier D1. This diode F1 is for example a transient-voltage-suppression (TFS) diode which can be used for protecting the driver module 50 from voltage spikes.

The rectified input voltage is applied according to the circuit of FIG. 5 between a first node A and a further node E representing ground. A capacitor arrangement comprising both capacitors C1 and C2 is provided between said node A and a further node B. This capacitor arrangement is configured to correspond to capacitor arrangements 11, 11', 11" of FIGS. 1-3 depending on the phase of the rectified input voltage. In accordance with FIGS. 1-3, the capacitor arrangement is connected in series with the LED string 10 and the current source IS1. The LED string 10 is provided between said node B and a further node C, while the current source IS1 is provided between a node D and note E.

Between nodes C and D, an optional second LED string 12 can be connected. This means that this second LED string 12 is optionally connected in series with a capacitor arrangement, the LED string 10 and the current source IS1.

Alternatively, node C may correspond to node D such that only the LED string 10 is provided.

The current source IS1 of the driver module 50 is adapted to control the current flowing through the LED string 10 and the optional second LED string 12. In all three phases of the present invention the LEDs D are preferably constantly driven by the current source IS1. Said current source IS1 comprises a switch in the form of a transistor M1 for controlling the current through the LEDs. Said transistor M1 is connected in series with the LED strings 10, 12. Preferably, the transistor M1 is implemented as a power transistor, for example a field-effect transistor (FET) and preferably an N-channel metal-oxide-semiconductor field effect transistor (MOSFET) as disclosed in FIG. 5.

The source of the transistor M1 is coupled to node E, i.e. ground, via a resistor R10. The gate of the transistor M1 is coupled to node E via a tunable Zener diode U1. The tunable Zener diode U1 can for example be a standard component such as TL431 or an adjustable precision Zener shunt regulator according to LM431, commercially available from e.g. Texas Instruments. The anode of the tunable Zener diode U1 is thereby connected to ground, its cathode is connected to the gate of transistor M1 and a reference terminal of the tunable Zener diode U1 is connected to the source of the transistor M1. The tunable Zener diode U1 can set a voltage reference. A Zener diode Z2 is provided between source and gate of the transistor M1. The gate of the transistor M1 is further coupled to node B, i.e. to the capacitor arrangement, via a serial arrangement of resistors R8, R9.

In the capacitor arrangement of FIG. 5, a serial arrangement of a diode D2, the capacitor C1 and a diode D3 is connected between nodes A and B in parallel to a further serial arrangement consisting in a diode D4, the capacitor C2 and a diode D5.

A first switching module 51 is provided for adaptively bypassing the diode D2 and the capacitor C1. Correspondingly, if the switching module 51 is switched on, a direct connection will be provided between the node A and the anode of the diode D3. This first switching module 51 comprises a Darlington circuit DA51 for switching on the switching module 51.

A second switching module 52 is connected between the cathode of diode D2 and the anode of diode D5 for adaptively connecting these two nodes. This second switching module 52 can be particularly used for providing a serial arrangement of the capacitors C1, C2.

A third switching module 53 is provided between the cathode of diode D4 and the cathode of diode D5. The third switching module 53 is adapted to selectively bypass the capacitor C2 and the diode D5.

The third switching module 53 is responsible for switching from the first charging phase to the second direct drive phase of the present invention. Said switching module 53 particularly comprises a Darlington transistor DA53 consisting of two transistors Q6, Q7 in the form of bipolar junction transistors. The transistors Q6, Q7 are in this embodiment of the PNP-type. According to alternative embodiments, the Darlington transistors of the present invention can comprise two NPN-type transistors, or can also be replaced by a Sziklai pair or complementary Darlington that comprises two transistors of opposite type, one NPN and one PNP. The Darlington transistor DA53 is preferably operated as a switch, wherein in the switched-on state the capacitor C2 and also the capacitor C1 are bypassed.

The emitter of the Darlington DA53 is connected to the cathode of the diode D4, while its collector is connected to node B. The base of said Darlington DA53 is connected to a further control circuitry adapted to switch on the Darlington DA53 and therefore adapted to bypass the capacitors C1, C2 as soon as the condition for entering the second phase of the invention is fulfilled. This control circuitry is based on a transistor Q8 coupled via a diode D6 between node A and the base of the Darlington transistor DA53. The base of said transistor Q8 is controlled by a circuitry comprising resistors, diodes, a capacitor and a Zener diode. This control circuitry in fact is a voltage sensor that switches on and off the Darlington DA53.

The module 51 may function similarly to the module 52, and can be switched on during the same phases as the module 52.

Said control circuitry is adapted to switch on the switching module 53 when the decreasing rectified mains voltage reaches at the time point t2 a value corresponding to the voltage across the LED string 10 plus the voltage across the charged capacitors C1, C2, the latter corresponding preferably to the voltage across nodes A and B. Preferably, the control circuitry is further adapted to switch on the switching module 53 when the rectified mains voltage reaches or falls below the LED string forward voltage Vf at time point t3, in order to facilitate the operation of the third discharging phase.

During the second direct drive phase, the switching module 52 is preferably switched off.

Said second switching module 52 comprises preferably a Darlington circuit DA52 adapted to be switched on during the third discharging phase.

Advantageously, the driver module 50 also comprises a further unit 55 for switching on and off the rectified AC mains voltage. According to a further aspect of the invention at the first half of phase 3—i.e. before the mains voltage reaches the zero crossing—the rectified mains voltage can be switched off in order to reduce losses. This is particularly advantageous because, as the mains voltage is switched off for this one period t3-t4, the mains supply will be a closer to a sine-wave. As such, the harmonics are reduced and the power factor is improved. This only relates to the first part of phase 3 ending when the rectified AC mains voltage reaches the value zero.

This further unit 55 for switching on and off the AC voltage vis-à-vis the capacitors C1, C2 and the LEDs D is implemented in FIG. 5 with a Darlington circuit DA55. When the Darlington circuit DA55 is switched off during the first phase of phase 3, the mains supply is switched off. As shown in FIG. 5, the Darlington circuit DA55 is controlled, i.e. switched on/off, by a voltage sensor.

Figure 6:
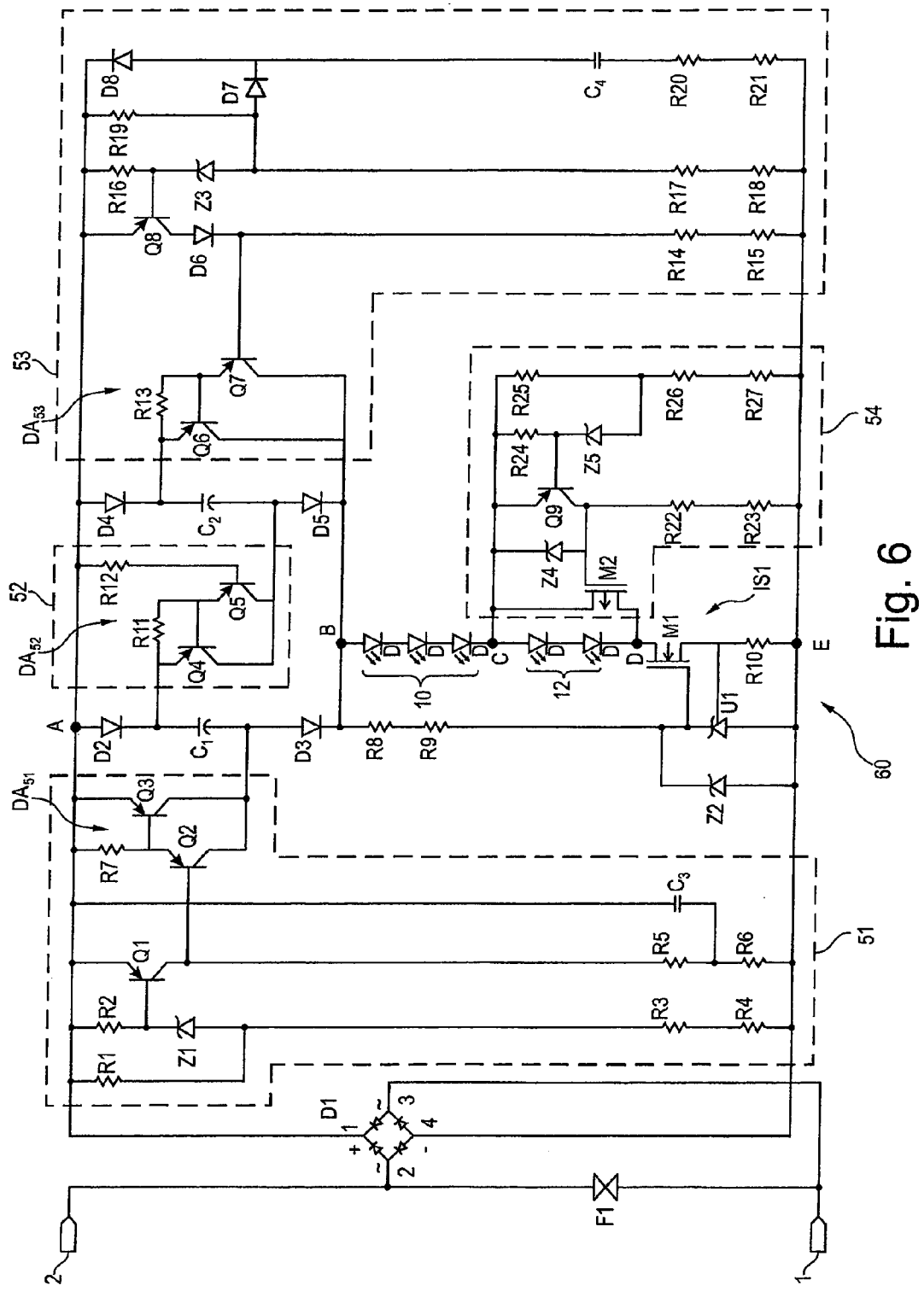
FIG. 6 shows a further embodiment of a driver module according to the present invention.

FIG. 6 shows an embodiment of a driver module 60. The driver module 60 is similar to the module 50 shown in FIG. 5 but does not comprise this further unit 55 for switching on/off the rectified AC voltage.

A further embodiment of the invention relates to the use of the second LED string 12.

Indeed, in FIG. 4 the hatched graph area H between the load voltage and the rectified mains voltage represents energy that is actually dissipated in heat via e.g. the current source. The surface of this hatched area H is converted into heat. For example in the first phase, the surface A1 below the bold line of the capacitor voltage VC represents the energy used to charge the capacitors C1, C2. The surface A2 between the capacitor voltage VC and the load voltage represents the energy used for driving the LEDs. On the other hand, the hatched surface H above the load voltage represents lost energy.

In order to avoid the losses represented by the upper area H, additional subgroups of LEDs in a LED string (connected in series) can be switched active in order to convert also this part of lost energy into light. An example of such subgroups is the second LED string 12.

This switching by an active switching can be made opportunistic in that the second LED string 12 is automatically switched on if there is a sufficient voltage difference between the rectified AC mains voltage and the load voltage to turn on the second LED string 12. The second LED string 12 is e.g. activated at t10, t2 and t3, see FIG. 4. The opportunistic switch goes off as soon as the difference between the AC voltage and the load voltage is below the forward voltage of the second LED string 12, as it happens e.g. at the time points t11, t12 and t13 in FIG. 4. The corresponding increased load voltage is shown in dotted line in FIG. 4.

Accordingly, the driver module 50 of FIG. 5 comprises a bypass module 54 that is adapted to bypass the second LED string 12 if the available voltage is not sufficient for the second LED string 12 to emit light, i.e. if the available voltage is lower that the forward voltage of the second LED string 12. This bypass module 54 corresponds to this opportunistic switching of the second LED string 12.

The addition of this second LED string 12 has the advantage that the efficiency of the driver module is increased, e.g. the efficiency can be increase from 63% to 80% in the embodiment of FIG. 4. The heat dissipation losses are also reduced. Also the AC mains voltage is used more efficiently.

Similarly, also a third LED string or even further LED strings could be added in series to the first 10 and second 12 LED string, to even further improve the efficiency of the driver module.

This addition of the second LED string 12 in fact leads to a ripple and a flickering in the emitted light intensity. However, for an AC mains voltage having a 50 Hz frequency, this ripple does not occur at 100 Hz, but rather at 300 Hz, which makes the flickering less visible to the human eye. In addition, the ripple is smaller than the flickering which occurs in known prior art driver modules for driving LEDs directly from an AC mains voltage.

To ensure that the flickering will not be visible, it is further on proposed to reduce the number of LEDs of the second LED string 12 vis-à-vis the number of LEDs of the first LED string 10. As such, the intensity of the light emitted by the second LED string 12 would be lower, which is advantageous for reducing the flickering effect. Further on and in view of the shape of the rectified AC mains voltage, with a smaller number of LEDs it is possible to increase the duration during which the second LED string 12 can be on. In a particular embodiment of the invention, the second LED string 12 can comprise 20 LEDs in series, while the first LED string 10 can comprise 44 LEDs in series.

On the other hand, if only one LED string 10 is driven with the driver module, there is no flickering effect at all because the LEDs are operated at a constant current. In all phases, the current through the LEDs is constantly driven by the current source. This is a major advantage of the invention over known prior art driver modules driving LEDs directly from an AC mains voltage.

Preferably and as shown in FIG. 4, the second LED string 12 can thus automatically be turned on in the first phase, in the second phase and in at least the part of the third phase in which the AC voltage decreases towards zero.

In this connection, a further advantage of the present invention is visible in FIG. 4, and particularly in the second part of the third phase starting at t=t0 with the start of a new half-wave and ending at t=t1 when the AC voltage reaches the forward voltage of the first LED string 10. In this time period from t0 to t1 it can be seen that the losses are nearly completely reduced. The load voltage is indeed very close below the rectified AC mains.

The invention is further advantageous because most of the switches of the transistors occur at lower voltage, i.e. particularly at voltages of less than 150 volts in comparison to the peak value of about 325 volts for a standard 230V AC mains voltage. This advantageously reduces the constraints on the transistors.

There is also no high frequency switching, which advantageously reduces the RFI issues. Indeed the invention does not make use of switched converters operated at a high frequency with respect to the 50 Hz or 60 Hz frequency of an AC mains voltage.

Additionally, in order to allow for a better heat dissipation, especially on an LED module, transistors used in the circuits previously described can be "split" into at least two transistors. This means that one transistor is replaced by at least two resistors and the current previously fed to the one transistor is now fed to the replacement transistors, the replacement transistors together performing the switching function of the replaced transistor. This results in the heat dissipation not being concentrated on one transistor, but being spread to the replacement transistors.

In typical (e.g. switched mode) LED drivers, power losses are distributed throughout the circuit, for instance within a transformer, a switch, an output diode, snubbers etc. The losses are caused, since the components used in the driver are not ideal, which in theory would lead to the losses being zero. However, LED drivers have well-defined theoretical losses caused by current passing through transistors, e.g. a linear control transistor. For example, a 25 Watts LED driver operating at 80% efficiency will need to dissipate 5 Watts, in particular in an output transistor.

If the required heat dissipation cannot be guaranteed, this can prevent the construction of thin or flat LED modules. Low-cost printed circuit boards (PCBs) may be made of composite material, being for example composed of woven glass fabric surfaces and a paper core combined with epoxy resin (CEM-1). This material does not conduct heat well and may hinder a heat transfer away from a heat source, such as a transistor. This is also the case for other materials used for PCBs that do not allow for a good heat dissipation themselves.

On low-cost PCBs, typically there are also insufficient heat conducting elements present, such as copper leads used to link the elements on the PCB (e.g. the copper thickness of the leads is too thin). Also other heat conducting elements suited for conducting heat away from a dominant heat source may not be able to dissipate enough heat and so additional cooling elements (e.g. a copper or aluminum heat sink) or additional space needs to be provided which takes up additional space or leads to additional cost. Hence, in most cases a metal PCB, which may be combined with additional cooling aids, is used, which allows a good heat conduction and dissipation, but leads to increased costs.

To overcome this limitation, according to an improved realization of the invention, the current normally supplied to and conducted by one transistor only, e.g. an output transistor, is distributed to a number of comparatively lower power replacement transistors. Advantageously these lower power transistors are connected in parallel, each dissipating fewer power or heat than the replaced transistor when conducting the current. These low power transistors can then be physically distributed across a surface of the PCB or LED module, which results in the heat loss being spread across the PCB to increase the available heat dissipation area.

Figure 7:
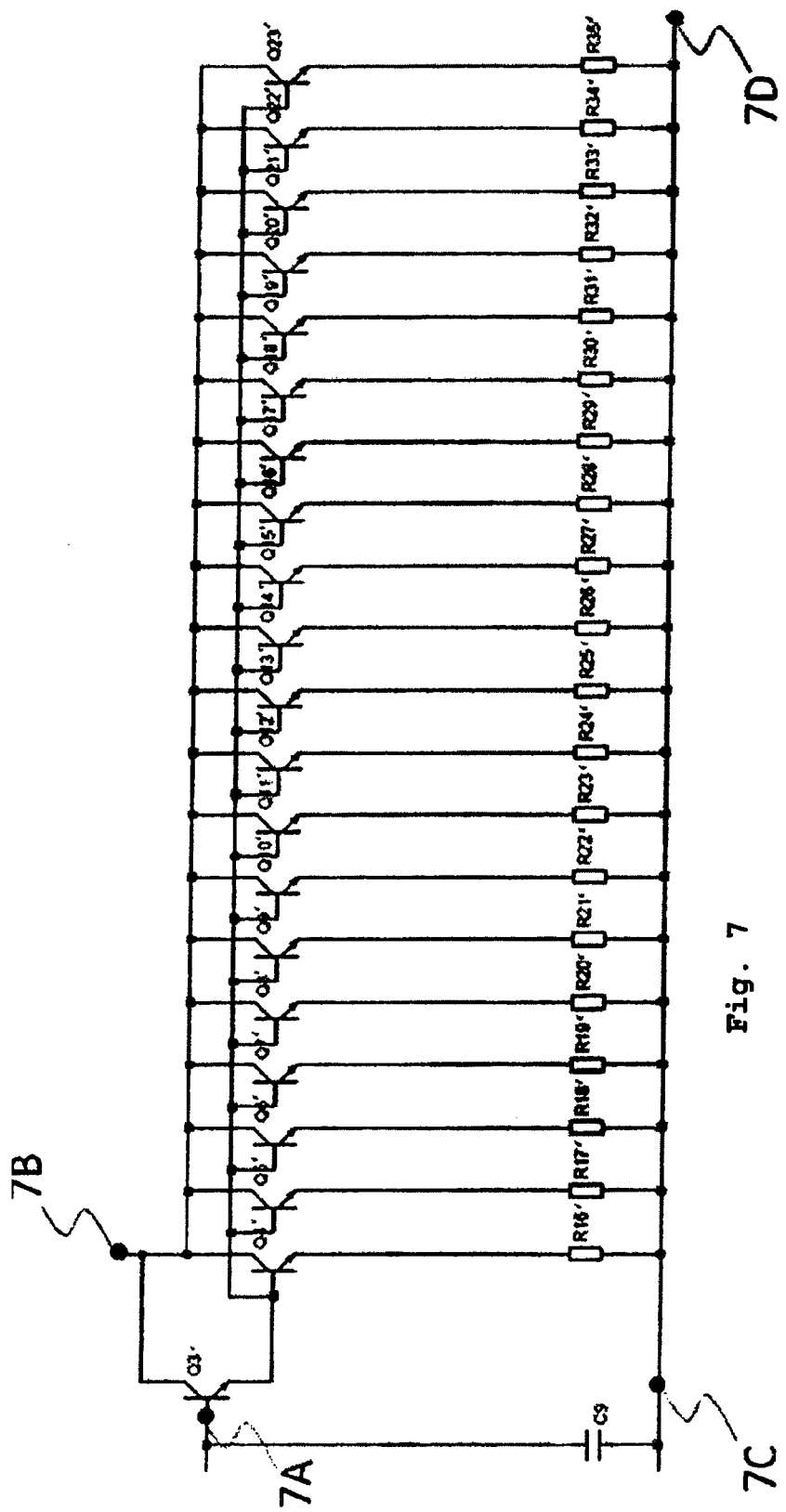
FIG. 7 shows a circuit detail according to an embodiment of a driver module according to the present invention.

FIG. 7 shows an exemplary detail arrangement of parallel transistors according to this aspect of the invention. In this exemplary detail, which can be integrated in one of the previously described circuits at connection points 7A-7D, when transistor Q3' switches to its conducting state, transistors Q4'-Q23' are also switched to be conductive. Hence, a current flows e.g. from connection point 7A to connection point 7C/7D through transistors Q4'-Q23', or portions thereof. The transistors can also be differently dimensioned. At the emitter of each of the transistors Q4'-Q23' a resistor R16'-R35' is connected. Capacity C9', which links the base of transistor Q3' with connection point 7C is optional and can be replaced by other components (for example a resistor, a diode, . . . ) depending on how the detail is integrated into a circuit. It should be understood, that the number of parallel transistors Q4'-Q23' can vary and preferably at least two parallel transistors are used, such as transistors Q4' and Q5'.

Moreover, the resistors R16'-R35' can be replaced by other components as required. Connection points 7C and 7D may be linked to the ground potential.

For example, the detail arrangement of FIG. 7 may serve to replace the single transistor M1 or MOSFET of the current source IS1. Connection point 7A, which connects to the base of transistor Q3', may be connected at the connection point of the replaced gate of transistor M1, while connection point 7C may be connected at node E; resistor R16' may replace resistor R10. The emitter of transistor Q4' may also be connected to tunable Zener diode U1. Connection point 7B may be connected to node D; connection point 7D may be connected to the lower potential side of resistor R23.

Additionally or alternatively, a (series) voltage limiter 80 can be used to increase transient immunity. Especially when a large number of parallel output transistors are used (e.g. 20 as in the example of FIG. 7), these transistors advantageously are of low cost. This limits the ratings and performance available by the transistors and in particular, it limits the voltage capability, for example to 300V.

Although the voltage limit is typically sufficient to handle high voltage drops during normal operation, but it can make the circuit vulnerable to transients. For example, a combination of transistors of a specific voltage and a LED string of a specific voltage can limit the overall voltage capability to a specific value. However, a transient-limiting variable voltage dependent resistor (VDR) clamps the voltage to a much higher voltage, which can be more than the drive circuit can handle without damage. In a more specific example, a combination of 300V transistors and a 100V LED string voltage limits the overall voltage capability to 400V, whereas the transient-limiting VDR effectively clamps the voltage to 700V. This is 300V more than the drive circuit allows.

Figure 8:
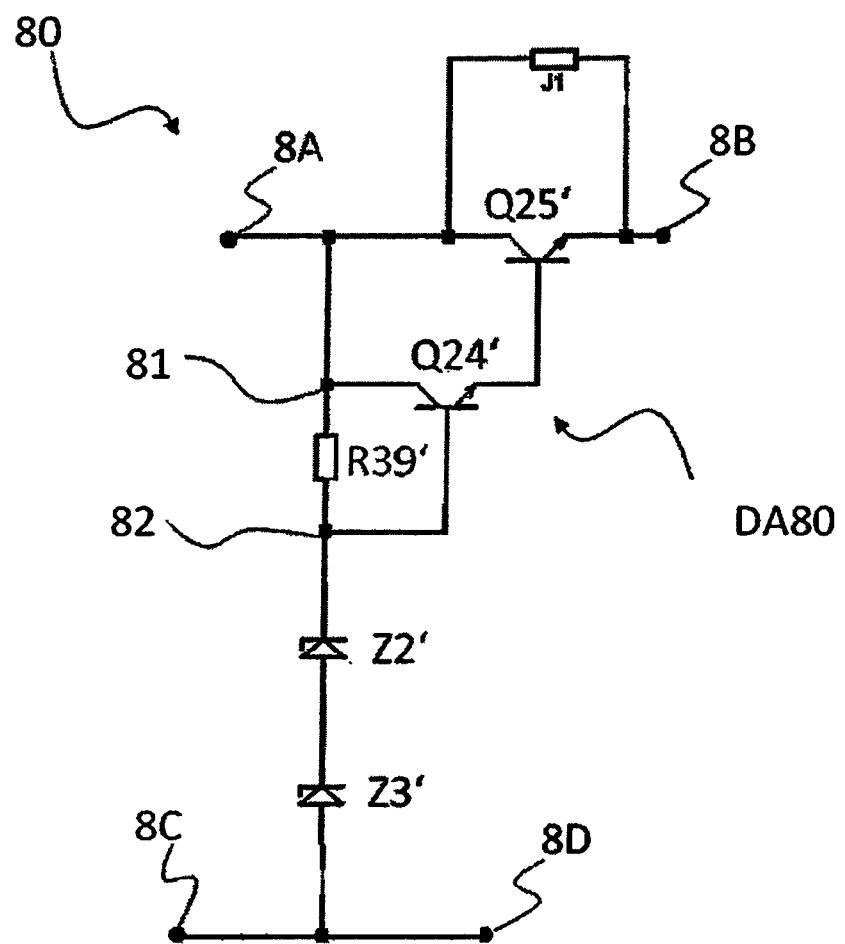
FIG. 8 shows a further circuit detail according to an embodiment of a driver module according to the present invention.

To overcome this limitation, an additional voltage-dropping circuit can be added to the circuits previously described. This is exemplarily shown in FIG. 8. In FIG. 8 a transistor, preferably a Darlington transistor DA80, illustrated with transistors Q24' and Q25' is provided, which is on, i.e. switched to its conductive mode, in normal operation and which is preferably connected in series with a rectified mains supply. Between connectors 81 and 82 a resistor R39' is connected. In series with this resistor R39', at least one Zener diode Z2', Z3' is connected. If the voltage at the at least one Zener diode Z2', Z3' increases above the breakthrough voltage of the at least one Zener diode Z2', Z3', the path between connection points 8A and 8C/8D becomes conductive, which results in a diversion of an excess current. Hence, a voltage limiting is achieved.

Continuing with the above example, the Darlington transistor can be a 300V transistor connected as an emitter follower. In normal operation the transistor is fully conductive, and drops very little voltage. However the follower emitter output is limited to 400V by the Zener diodes Z2', Z3' clamping the base terminal of the transistor, so that additional input voltage is dropped across the transistor. This allows the system to survive transients up to 700V. Additional voltages are clamped by the voltage dependent resistor, which may be played as an alternative to the diode F1 of the example of FIG. 6, for example extending overall transient capability to beyond 1 kilo Volts. An optional jumper J1 is also shown, which allows bridging transistor Q25' and allows to model circuits, in which transistor Q25' is not used.

The detail of FIG. 8 can be connected directly after the bridge rectifier D1 of FIG. 5 or FIG. 6 (e.g. in front of the driver circuit itself). For example connection point 8A may be connected to the positive terminal + of bridge rectifier D1, while connection point 8C may be connected to the negative terminal − of the bridge rectifier D1. Connection point 8B may be connected to the higher potential side of resistor R1, where connection point 8D may be connected to the lower potential side of resistor R4.

Alternatively or additionally, a binary switching pattern can be used to obtain different physical LED string length by switching LED string segments, which are advantageously of different length. These LED string segments can be suitable to replace LED string 11 and/or LED string 12 of FIG. 5 or 6 connected between node B and node C, node C and node D and/or node B and node C.

Figure 9:
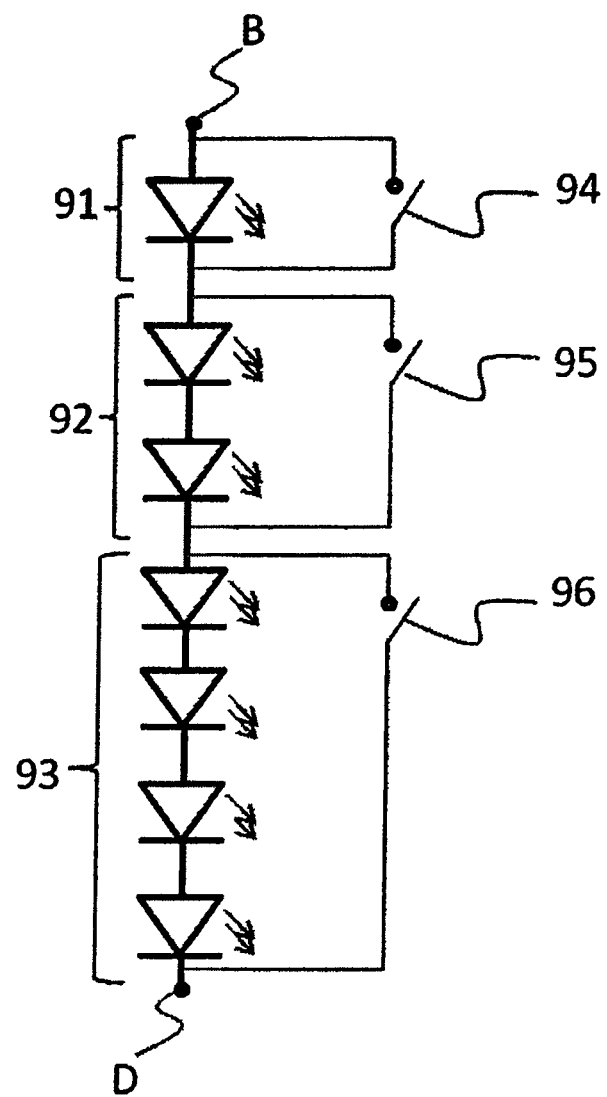
FIG. 9 shows yet a further circuit detail according to an embodiment of a driver module according to the present invention.

For example, LED string segments 91, 92, 93 can be used. In the example of FIG. 9, LED string segment 91 comprises one LED, LED string segment 92 comprises two LEDs, and LED string segment 93 comprises four LEDs. The LED string segments 91, 92, 93 can be selectively switched on and off by segment switches 94, 95 and 96. When segment switch 94 is switched on, i.e. to its conductive state, LED string segment 91 is off, as it is bridged. Similarly, when segment switch 95 is switched on, LED string segment 92 is off. Moreover, when segment switch 96 is switched on, LED string segment 93 is off.

Using the segment switches 94, 95, 96, the three exemplary LED string segments 91, 92, 93 can hence be activated or deactivated in a binary fashion, in particular to obtain 7 different LED overall string lengths (with the addition of an eighth variant with the length 0, when all segment switches 94-96 are conductive). Of course, a different number would lead to more or less possible LED string length combinations.

The three LED string segments 91, 92, 93 exemplary shown in FIG. 9 have relative lengths of 1, 2 and 4, so they can be switched in binary sequence to obtain the different overall lengths. The activation or deactivation of the LED string segments can follow the mains voltage waveform rise and fall, so that the LED string voltage of the activated LED string segments 91, 92, 93 closely matches the mains voltage at any instant.

This function could be implemented by e.g. a controller which controls the by-passing of the LED strings by controlling the segment switches 94, 95, 96. The switches 94, 95, 96 of course can be realized as transistors (bi-polar, FET, MosFET, . . . ). Such a controller (microcontroller, ASIC, IC, . . . ) may monitor the supply voltage (e.g. rectified mains), or may control a compensation circuit (not shown). The controller activates/deactivates the switches 94, 95, 96 to control the by-passing of the LED string segments 91, 92, 93. Optionally the segment switches 94, 95, 96 for bypassing of the LED string segments 91, 92, 93 may also be comprised inside the controller.

The invention claimed is:

1. Driver module for driving LEDs, wherein the driver module comprises:
   a rectifier (D1) for generating a supply voltage by rectifying an input AC voltage (Vin),
   a load path with nodes (B, C) for connecting an LED string (10) comprising one or a plurality of LEDs (D),
   a current source (IS1) coupled with the load path for generating a preferably constant current for the load path, and
   a capacitive unit comprising at least two capacitors (C1, C2) for storing electrical energy from the rectifier (D1) during a charging phase and for providing electrical energy to the load path during a discharging phase, wherein a capacitive arrangement (11, 11', 11") is configured such that the two capacitors (C1, C2) are in a parallel arrangement (11) in the charging phase and in a serial arrangement (11") in the discharging phase, and wherein the capacitive arrangement is configured to be bypassed in a direct drive phase, in which the load path is driven by the supply voltage.

2. Driver module according to claim 1, wherein the discharging phase ends and the charging phase begins when the supply voltage reaches or exceeds the forward voltage (Vf) of the LED string (10).

3. LED-module comprising:
a driver module according to claim 1, and
an LED string (10) connected in the nodes (B, C).

4. Driver module according to claim 1, wherein the charging phase ends and the direct drive phase starts when the supply voltage reaches or falls below a value being the addition of the forward voltage (Vf) of the LED string (10) and the voltage across the capacitors (C1, C2).

5. Driver module according to claim 1, wherein the direct drive phase ends and the discharging phase starts when the supply voltage reaches or falls below the forward voltage (Vf) of the LED string (10).

6. Driver module according to claim 2, comprising voltage sensors for automatically detecting the condition for ending a phase and beginning a new phase.

7. Driver module according to claim 1, comprising a switching module (52) coupled between the two capacitors (C1, C2) in such a way that the parallel arrangement (11) is active if the switching module (52) is switched off, and the serial arrangement (11") is active if the switching module (52) is switched on.

8. Driver module according to claim 1, comprising a switching module (53) coupled to the capacitive unit so as to bypass, in the direct drive phase, the capacitors (C1, C2) if the switching module (53) is switched on.

9. Driver module according to claim 1, wherein the load path, the current source (IS1) and the capacitive unit are connected in series.

10. Driver module according to claim 1, wherein the driver module comprises a voltage limiter (80), the voltage limiter preferably comprising a Darlington transistor (DA80) and/or being connected in series with a voltage supply source.

11. Driver module according to claim 1, further comprising a module (55) for switching off the supply voltage during the discharging phase, and preferably from the beginning of the discharging phase until the supply voltage reaches a value zero, such that only the capacitive unit provides electrical energy to the load path.

12. LED-module comprising:
a driver module according to claim 11,
an LED string (10) connected in the nodes (B, C), and
a second LED string (12) connected in further nodes (C, D).

13. Driver module according to claim 1, wherein a transistor, in particular an output transistor of said current source, is replaced by a number of parallel transistors (Q4'-Q23').

14. Driver module according to claim 13, wherein the number of parallel transistors (Q4'-Q23'), in their conductive state, in common conduct the same current as the replaced transistor and perform the same switching action as the replaced transistor.

15. Driver module according to claim 13, wherein the number of parallel transistors (Q4'-Q23') are distributed across a LED module and/or a PCB.

16. Driver module for driving LEDs, wherein the driver module comprises:
a rectifier (D1) for generating a supply voltage rectifying an input AC voltage (Vin),
a load path with nodes (B, C) for connecting an LED string (10) comprising one or a plurality of LEDs (D),
a current source (IS1) coupled with the load path for generating a preferably constant current for the load path, and
a capacitive unit comprising at least two capacitors (C1, C2) for storing electrical energy from the rectifier (D1) during a charging phase and for providing electrical energy to the load path during a discharging phase,
wherein a capacitive arrangement (11, 11', 11") is configured such that the two capacitors (C1, C2) are in a parallel arrangement (11) in the charging phase and in a serial arrangement (11") in the discharging phase, and
wherein the load path comprises further nodes (C, D) for connecting a second LED string (12) in series with the LED string (10), and a bypass module (54) is provided so as to automatically bypass the further nodes (C, D) if the supply voltage is not sufficient to drive the second LED string (12).

17. Driver module according to claim 16, wherein the first LED string (10) and/or the second LED string (12) comprise at least two LED string segments (91, 92, 93), which can be selectively activated/deactivated by segment switches (94, 95, 96), preferably according to a binary switching pattern.

18. Driver module according to claim 17, wherein the at least two LED string segments (91, 92, 93) comprise a different number of LEDs.

19. Driver module according to claim 16, wherein the LED string (10) and the second LED string (12) respectively consist in LEDs connected in series, and the number of LEDs of the second LED string (12) is lower than the number of LEDs of the LED string (10), preferably lower than half the number of LEDs of the LED string (10).

20. Method for driving LEDs, comprising:
generating a supply voltage by rectifying an input AC voltage (Vin),
generating a preferably constant current for a load path with nodes (B, C) for connecting an LED string (10) comprising one or a plurality of LEDs (D),
storing electrical energy by a capacitive unit comprising at least two capacitors (C1, C2) from the supply voltage during a charging phase and providing said electrical energy to the load path during a discharging phase,
configuring a capacitive arrangement such that the two capacitors (C1, C2) are in a parallel arrangement (11) in the charging phase and in a serial arrangement (11") in the discharging phase, and
wherein the capacitive arrangement is configured to be bypassed in a direct drive phase, in which the load path is driven by the supply voltage.

\* \* \* \* \*